US012126192B2

(12) United States Patent
Nikles (10) Patent No.: US 12,126,192 B2
(45) Date of Patent: Oct. 22, 2024

(54) CHARGING SYSTEM AND CHARGING DEVICE FOR A HEARING DEVICE

(71) Applicant: Sivantos Pte. Ltd., Singapore (SG)

(72) Inventor: Peter Nikles, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 444 days.

(21) Appl. No.: 17/509,235

(22) Filed: Oct. 25, 2021

(65) Prior Publication Data

US 2022/0131425 A1 Apr. 28, 2022

(30) Foreign Application Priority Data

Oct. 23, 2020 (DE) .................. 10 2020 213 427

(51) Int. Cl.
*H02J 50/90* (2016.01)
*H02J 7/00* (2006.01)
*H02J 7/02* (2016.01)
*H02J 50/10* (2016.01)
*H04R 25/00* (2006.01)

(52) U.S. Cl.
CPC ............ *H02J 50/90* (2016.02); *H02J 7/0044* (2013.01); *H02J 7/02* (2013.01); *H02J 50/10* (2016.02); *H04R 25/602* (2013.01); *H04R 2225/31* (2013.01)

(58) Field of Classification Search
CPC .. H02J 50/90; H02J 7/0044; H02J 7/02; H02J 50/10; H02J 7/0042; H02J 50/005; H04R 25/602; H04R 2225/31; H04R 25/55; H04R 25/60; H04R 2225/025
USPC ....................................................... 320/108
See application file for complete search history.

(56) References Cited

U.S. PATENT DOCUMENTS

| | | | | |
|---|---|---|---|---|
| 9,161,141 B2 * | 10/2015 | Martius | ................... | H02J 50/70 |
| 10,777,892 B2 * | 9/2020 | Nikles | ...................... | H01Q 7/06 |
| 10,893,368 B2 * | 1/2021 | Nikles | ...................... | H01Q 1/24 |
| 11,337,013 B2 * | 5/2022 | Nikles | .................... | H01Q 1/273 |
| 11,343,627 B2 * | 5/2022 | Nikles | .................. | H04R 25/602 |
| 11,368,795 B2 * | 6/2022 | Nielsen | .................. | H04R 25/02 |
| 2007/0104343 A1 * | 5/2007 | Bengtsson | ........... | H04R 25/305 |
| | | | | 381/322 |

(Continued)

FOREIGN PATENT DOCUMENTS

DE    102012218663 A1 *  4/2014  ............ H02J 7/0044
DE    102019217861 B3     5/2021

(Continued)

*Primary Examiner* — M Baye Diao
(74) *Attorney, Agent, or Firm* — Laurence A. Greenberg; Werner H. Stemer; Ralph E. Locher (57) ABSTRACT

A charging system has a charging device and a hearing device. The hearing device has a front portion in which a secondary charging winding is arranged. The charging device has a charging housing with a receiving space that extends in a longitudinal direction and that has an opening. The charging device also has a primary charging winding formed circumferentially about an inner space. The hearing device is insertable with its front portion into the inner space. A secondary charging winding is wound around a component of the hearing device, such as a receiver. To ensure efficient charging, at least one magnetic layer, namely a primary magnetic layer, is arranged around the primary charging winding and/or a secondary magnetic layer is arranged between the component and the secondary charging winding.

16 Claims, 6 Drawing Sheets

(56) References Cited

U.S. PATENT DOCUMENTS

2018/0359576 A1* 12/2018 Nikles .................. H01Q 7/08
2020/0260176 A1*  8/2020 Baltensperger ........ H04R 25/55
2021/0152958 A1   5/2021 Nikles

FOREIGN PATENT DOCUMENTS

GB          2569536 A    6/2019
JP          2015002580 A 1/2015
WO          2019037854 A1 2/2019

* cited by examiner

CHARGING SYSTEM AND CHARGING DEVICE FOR A HEARING DEVICE

CROSS-REFERENCE TO RELATED APPLICATION

This application claims the priority, under 35 U.S.C. § 119, of German Patent Application DE 10 2020 213 427.8, filed Oct. 23, 2020; the prior application is herewith incorporated by reference in its entirety.

FIELD AND BACKGROUND OF THE INVENTION

The invention relates to a charging system comprising a charging device and a hearing device, and further relates to a charging device for a hearing device.

The term "hearing device" is generally understood to mean a device that is adapted to process and present sound or a sound signal to a person. More specifically, the present invention relates to a hearing aid. Herein, it is understood that a hearing aid is used for providing ambient acoustic signals to a hearing-impaired person. The acoustic environmental signals are thereby processed and typically amplified for compensation or also therapy of a respective hearing impairment. Such a hearing aid device consists in principle of one or more input transducers, a signal processing device, an amplification device and an output transducer. The input transducer is usually a receiving transducer, such as, a microphone and/or an electromagnetic receiver, for example, an induction coil. The output transducer is typically implemented as an electroacoustic transducer, e.g., miniature loudspeaker, or an electromechanical transducer, e.g., bone conduction earpiece. It is also referred to as a receiver. The output transducer generates output signals, specifically sound signals, which are directed to the patient's (hearing impaired person's) hearing and create an auditory perception in the patient. The amplifier is usually integrated into the signal processing device. The hearing aid is powered by a battery integrated in the housing of the hearing aid. Usually, (hearing aid) components are arranged on or connected to a printed circuit board as a circuit carrier.

There are different embodiments of hearing devices, in particular hearing aids. These are, by way of example, ITE hearing aids (In-the-Ear), BTE hearing aids (Behind the Ear), RiC hearing aids (Receiver in Canal), CiC hearing aids (Completely in Canal). The latter are similar to ITE hearing aids, but are worn completely in the ear canal. In the case of ITE hearing aids, the housing, which contains all functional components including the microphone and the receiver, is worn at least partially in the ear canal. ITE or CiC hearing aids in particular therefore have a very small design.

Hearing devices, especially hearing aids, often have an antenna arrangement which is used, for example, for the wireless transmission of data signals or acoustic signals. The antenna arrangements may be provided for different purposes. For example, the antenna arrangement serves for wireless communication with another device, for example with another hearing aid in case of a binaural fitting. In addition, such an antenna arrangement may also be configured for wireless communication with another external device, for example a player for music and speech. Furthermore, the antenna arrangement may also be used for wireless charging, in particular inductive charging, of a battery of the hearing aid. Due to space limitations, in the case of an antenna arrangement, shielding between the antenna arrangement and other electrical components is often required and desired to avoid unwanted mutual interference.

My commonly assigned US 2021/0152958 A1 and its counterpart German Patent No. DE 10 2019 217 861 B3 discloses a hearing aid, in particular an ITE hearing aid with a special, space-saving antenna with high efficiency. My earlier patent is herewith incorporated by reference. In that hearing aid, the receiver, designed as an electroacoustic transducer, is arranged in a front part of a housing. A magnetic layer, in particular in the form of a ferrite foil, is arranged around the receiver, at least in certain areas, around which in turn a secondary winding forming the antenna is wound. The magnetic layer is formed in particular by individual tabs and extends beyond the earpiece into a widened housing region of the housing. Further functional components of the hearing aid are arranged in this widened housing region, specifically components for signal processing. The secondary winding described therein and arranged around the receiver can be used for inductively charging the battery of the hearing aid.

In wireless charging, especially inductive charging, the general object is to achieve the best possible coupling between a primary charging winding and a secondary charging winding in order to keep charging losses as small as possible.

SUMMARY OF THE INVENTION

It is accordingly an object of the invention to provide a charging system which overcomes the above-mentioned disadvantages of the heretofore-known devices and methods of this general type and which provides for the most efficient inductive charging possible with a simple structure for a hearing aid, in particular for an ITE hearing aid and, specifically, for the hearing aid in my application US 2021/0152958 A1 and German Patent DE 10 2019 217 861 B3.

With the above and other objects in view there is provided, in accordance with the invention, a charging system, comprising:

a hearing device having a front part, a secondary charging winding arranged in the front part and being disposed around a component of the hearing device; and a charging device having:

a charging housing formed with a receiving space which extends along a center axis in a longitudinal direction and which has an opening at least to one side in the longitudinal direction;

a primary charging winding running around the center axis and surrounding an inner space that is formed to receive the hearing device, to be inserted with the front part thereof into the inner space; and at least one magnetic layer selected from the group consisting of:
  a primary magnetic layer extending around the primary charging winding; and
  a secondary magnetic layer arranged between the component and the secondary charging winding.

In other words, the objects are solved according to the invention by a charging system with a charging device as well as with a hearing device, especially a hearing aid, wherein the hearing device has a front part in which a secondary charging winding is arranged. The charging device comprises a charging housing having a receiving space which extends along a center axis in a longitudinal direction and which has an opening in the longitudinal direction at least towards one side. Further, the charging device comprises a primary charging winding formed circumferentially around the center axis and surrounding an inner space. The hearing device can be inserted into the inner space with its front part. In the inserted state, the secondary charging winding is therefore arranged within and surrounded by the primary charging winding.

This design on the one hand of the hearing device and on the other hand of the charging device therefore allows the hearing device to be plugged into the charging device in a simple manner, so to speak, and in such a way that the two charging windings are automatically aligned coaxially with one another, thereby ensuring particularly effective coupling and thus particularly effective energy transmission.

The two charging windings are generally coils that have a coil or winding length when viewed in the longitudinal direction. The primary charging winding is therefore a hollow coil into which the secondary charging winding is inserted.

The primary charging winding, for example, is arranged inside the receiving space. It is typically connected and fixed to the charging housing via a support structure. For example, a support element is arranged on the bottom side and/or at least one radial retaining arm extending from a side wall is formed, which retains the primary charging winding. For example, the primary charging winding is generally wound on a cylindrical support via which the mechanical holding forces are absorbed via the support structure. In particular, the electrical connection of the two ends of the winding is also made via the support structure. As an alternative to a support structure arranged inside the receiving space, the primary charging winding is, for example, embedded, for example cast, in a wall bounding the receiving space.

Generally, a charging control is further provided in the charging device and/or in the hearing device to control the charging process. A rechargeable battery is further arranged in the hearing device.

The hearing device further comprises a component around which the secondary charging winding is arranged. Preferably, the secondary charging winding is arranged around the component. In particular, the secondary charging winding is wound around the component in the manner of a coil. In particular, the component is an electrical or electromagnetic component. Preferably, the component is a receiver which is specifically designed as an electroacoustic transducer and thus for emitting sound.

The receiver is typically adjoined by a sound channel or sound outlet formed at one end of the hearing device. In particular, in an ITE hearing aid, the receiver is arranged in the front part, which defines an end front part and, in particular, is tapered so that it can penetrate into the auditory canal of a user. This tapered and thus approximately dome-shaped front part of the housing is therefore inserted into the interior of the primary charging winding.

The charging system further comprises at least one magnetic layer, namely a primary magnetic layer and/or a secondary magnetic layer. Preferably, both magnetic layers are provided.

The primary magnetic layer extends around the primary charging winding, and preferably completely circumferentially around the primary charging winding. In particular, it extends on or in a circumferential wall of the receiving space.

Due to this primary magnetic layer, the magnetic field lines and thus the magnetic flux are defined on the side of the charging device and thus guided as loss-free as possible, which contributes to the desired charging process with the greatest possible efficiency.

The secondary magnetic layer is arranged between the component and the secondary charging winding. In particular, this magnetic layer is a foil layer. Preferably, an electrical shielding layer is additionally arranged, which is formed together with the magnetic layer, for example, as a multilayer, in particular two-layer foil. The particular advantage of the arrangement of the magnetic layer, in particular also in combination with the electrical shielding layer, is to be seen in the fact that during the charging process the magnetic field lines and thus the magnetic field are guided in a targeted manner via the magnetic layer. At the same time, the secondary magnetic layer, in particular also in combination with the secondary electrical shielding layer, provides shielding and thus protection of the component. The component is therefore protected from the magnetic field during the charging process by the secondary magnetic layer.

Where reference is made to a magnetic layer, this is understood to mean a layer which consists of or comprises a magnetically permeable material. The permeability number of the magnetic layer is at least greater than 1, so that the material is at least paramagnetic. Preferably the permeability number is much greater than 1 (at least 5, preferably at least 10) such that the permeable material is generally ferromagnetic or ferrimagnetic. Preferably, the permeability number is in the range between 40 and 700 and more preferably in the range between 100 and 300. The magnetic layer is, for example, a suitable film layer or alternatively a body, for example cast or injection moulded, comprising or at least having the magnetically permeable material.

According to a preferred embodiment, the hearing device extends along a device-longitudinal direction, which preferably also indicates the longitudinal direction of the component and especially of the receiver. The hearing device has a housing which widens in the direction of this device-longitudinal direction and there—downstream of the front part—has a widened housing region. This has a first radial extent which is greater than a second radial extent, in particular a diameter of the opening of the charging housing, so that the hearing device rests on an opening edge of the opening in the charging device in the inserted state. Generally, the charging device is adapted to the hearing device in such a way that the hearing device enters the receiving space only with its front part and comes to rest on the opening edge with a rear housing part. This defines a relative axial position between the hearing device and the charging device, which ensures that the two charging windings are arranged in a defined axial relative position to each other. This is specifically selected such that a maximum axial overlap between the two charging windings is achieved. In this respect, an axial self-centering takes place.

Preferably, the housing of the hearing device and the charging housing are also adapted to each other, in particular in the region of the opening, in such a way that radial self-centering also takes place at the same time. As an alternative to radial self-centering via the opening, radial self-centering is effected by a preferably complementary design between the front part and the inner space surrounded by the primary charging winding. For example, the primary charging winding is wound on a hollow carrier into which the front part of the hearing device is inserted for charging.

In a preferred further embodiment, the secondary magnetic layer extends longitudinally of the device beyond the component into the widened housing region. The magnetic layer preferably widens and extends along or at least near the widened housing wall in the widened housing region. The magnetic layer is preferably formed by or comprises a plurality of strip-like tabs. The magnetic field lines and thus the magnetic flux during the charging process are guided in a defined manner via this magnetic layer and the individual tabs.

Preferably, the secondary magnetic layer has a higher permeability number than the primary magnetic layer of the charging device. For example, the permeability number is greater by at least a factor of 1.5.

The permeability number is often chosen depending on the frequency for which the particular winding is designed, with lower permeability numbers being used with higher frequency. The secondary charging winding on the hearing device side is typically used also for other functions besides charging, such as wireless communication, for example in binaural hearing aids. Here, communication frequencies are typically used in the megahertz range, in particular in the range of about 3 MHz or 10 MHz. Frequencies in the range between some 100 MHz and some 1000 MHz may also be used. Charging often typically employs a lower frequency, for example in the range of typically 102 kHz. In addition, there are also charging concepts with frequencies in the two-digit MHz range, for example via RFID at 13.56 MHz or also with higher frequencies, for example at 26 MHz.

An advantage of the higher permeability number of the secondary magnetic layer is to be seen in particular in the fact that a distance between the primary charging winding and the primary magnetic layer can be kept small and at the same time it is ensured that the magnetic flux flows via the secondary magnetic layer and thus through the secondary charging winding.

The primary magnetic layer preferably forms an inner side of the receiving space, thus lining or covering it in this respect. According to one embodiment, the entire receiving space is lined by the magnetic layer.

In a preferred embodiment, the magnetic layer is spaced from the primary charging winding in the radial direction, i.e. perpendicular to the longitudinal direction. The distance is sufficiently large so that during the charging process it is ensured that the magnetic flux is guided through the interior of the secondary charging winding. For example, the distance is between 0.3 cm to 1.5 cm or even up to 2 cm.

In a preferred embodiment, the primary magnetic layer is formed at an opening edge of the opening. With this design—especially in combination with the secondary magnetic layer, which extends into the widened housing region of the hearing device—the particular advantage is achieved that the two magnetic layers are arranged in the immediate vicinity of each other at the opening edge, so that the magnetic flux is guided largely completely over the magnetic layers and as little as possible over air.

Preferably, the primary magnetic layer forms an annular flange at the edge of the opening so that an end edge in the region of the opening is covered by the magnetic layer.

In a preferred further development, an electrically conductive layer is arranged between the primary charging winding and the primary magnetic layer. This consists of or is made of a metal with high electrical conductivity, in particular copper. This electrically conductive layer is arranged annularly around the primary charging winding. In particular, it delimits an inner side of the receiving space and is applied, for example, to the primary magnetic layer. This conductive layer forms a kind of shielding layer, which prevents a kind of "short-circuit" of the magnetic flux and ensures that it flows through the interior of the secondary charging winding. The conductive layer is arranged at least at the axial level of the primary charging winding, and preferably extends longitudinally over an axial length corresponding to the axial length of the primary charging winding (winding length). Preferably, the conductive layer extends only in the region of the primary charging winding. For example, the axial length of the conductive layer is in the range of 0.7 times to 2 times the winding length of the primary charging winding.

The electrically conductive layer is further preferably formed as an open ring or open jacket. This means that the conductive layer is arranged circumferentially around the center axis, but its end regions are not connected to one another, i.e. the conductive layer is not electrically closed in the circumferential direction. This avoids the occurrence of eddy currents in this layer. The electrically conductive layer is preferably formed as a foil. It extends, for example, over an angular range of at least 300° and preferably over at least 350°, so that a gap is formed in the circumferential direction. Alternatively, the end regions of the foil overlap, but without being electrically connected to one another. In the overlap region, the end regions are therefore electrically insulated from one another. Such an embodiment variant is used in particular at low frequencies, for example in the range of 102 kHz.

In a preferred embodiment, the primary magnetic layer is interrupted in the region of the primary charging winding as viewed in the longitudinal direction. The interruption has an axial length which is preferably adapted to the axial winding length of the primary charging winding. In particular, this interruption extends between 0.7 times and 2 times the winding length. This interruption is thereby arranged in particular alternatively to the conductive layer or also in combination therewith. Both the interruption and the conductive layer serve the purpose of keeping the distance between the primary charging winding and the inner side of the receiving space, on which the primary magnetic layer is formed, as small as possible without the risk of the "magnetic short circuit" described above.

In a useful embodiment, the charging housing also has a bottom, i.e. it is pot-shaped in this respect. In the embodiment with the primary magnetic layer, this preferably also covers the base. In a preferred embodiment, the magnetic layer itself is therefore also of pot-shaped design and is inserted into the pot-shaped receiving space or lines the same.

In the embodiment variant with the interruption of the primary magnetic layer, this is generally formed in two parts with a lower part and an upper part. In the embodiment variant with the bottom, the lower part is in turn pot-shaped, to which the upper part adjoins in a sheath-shaped manner at a distance in the longitudinal direction and, in particular, extends as far as the opening. In the embodiment variant with the annular flange, this upper part additionally has the annular flange.

In a useful embodiment, the geometry of the receiving space is preferably adapted to the geometry of the hearing device, in particular the front part of the hearing device. This is understood to mean in particular that the inner contour of the receiving space follows the outer contour of the front part of the hearing device.

In a particularly preferred embodiment, it is provided that the receiving space widens in the longitudinal direction, in particular in the region of the opening. In this widened end region, the inner wall preferably runs parallel to the housing wall of the widened housing region of the hearing device.

Preferably, the receiving space tapers towards the bottom. This measure further improves the coupling between the two windings during the charging process.

The task is further solved according to the invention by a charging device for a hearing device, the charging device having a charging housing with a receiving space which extends along a center axis in a longitudinal direction and which has an opening in the longitudinal direction at least to one side, via which the hearing device can be inserted at least partially into the receiving space. The charging device further comprises a primary charging winding, which is formed circumferentially about the center axis and surrounds a free inner space, such that the hearing device can be inserted into the inner space with a front part. The charging device further comprises a primary magnetic layer which extends around the primary charging winding.

The advantages and preferred embodiments mentioned with regard to the charging system apply equally to the charging device and are to be applied mutatis mutandis to the latter.

Other features which are considered as characteristic for the invention are set forth in the appended claims.

Although the invention is illustrated and described herein as embodied in charging system and charging device for a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Functionally and structurally equivalent parts and elements having the same effect are provided with the same reference signs throughout the figures.

DETAILED DESCRIPTION OF THE INVENTION

Figure 1:
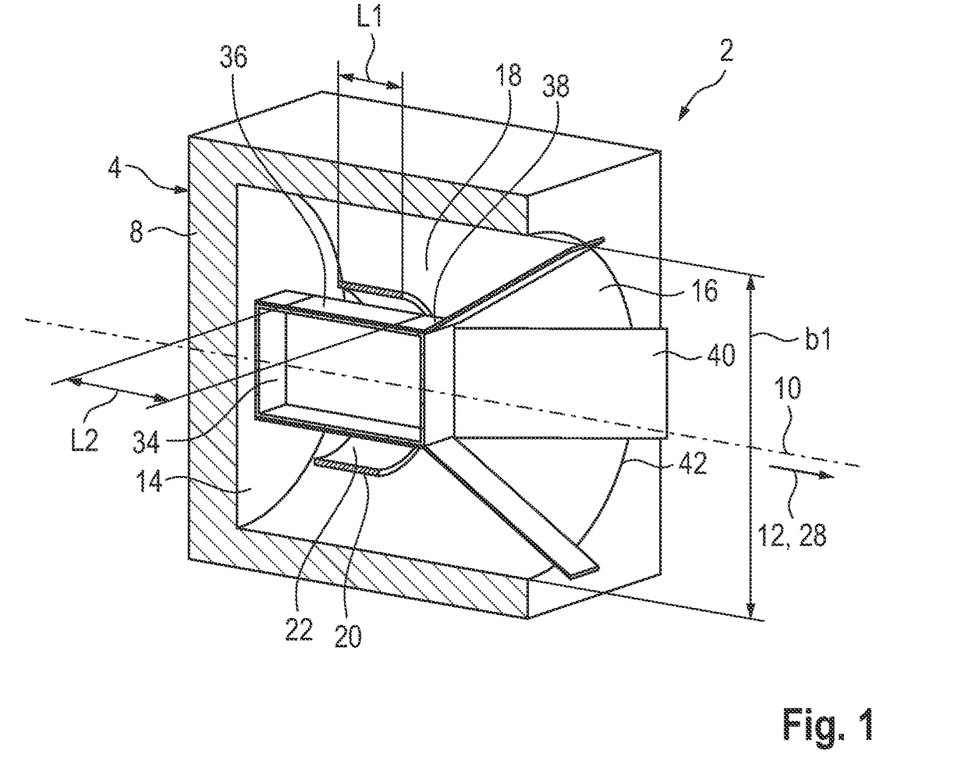
FIG. 1 is a section taken through a charging system according to a first variant with a simplified charging device and with simplified and only partially shown components of a hearing device.

Referring now to the figures of the drawing in detail and first, in particular, to FIG. 1 thereof, there is shown a charging system 2 with a charging device 4 and a hearing device 6. The charging device 4 generally comprises a charging housing 8, which in the shown example is pot-shaped. The charging housing 8 comprises a wall, which is typically made of plastic. The charging housing 8 extends along a center axis 10 in a longitudinal direction 12, and it comprises a bottom 14 and an opening 16 opposite thereto. The charging housing 8 has a wall circumferentially around the center axis 10, which encloses a receiving space 18. In the illustrated example, the receiving space 18 is bounded by the bottom 14 opposite the longitudinal direction 12. In the illustrated example, the receiving space 18 is cylindrical. Alternatively, it deviates from the cylindrical shape and is adapted in particular to a geometry of the hearing device 6.

The charging device 4 further comprises a primary charging winding 20, which is of the coil type and extends around the center axis 10 and is oriented in the longitudinal direction 12. The primary charging winding 20 surrounds an inner space 22, and it has a primary winding length L1 in the longitudinal direction 12. This primary charging winding 20 is fixed within the charging housing 8 via a support structure which is not shown in detail here. Preferably, the electrical connection of winding ends of the primary charging winding 20 is also effected via this support structure. The charging device 4 and the hearing device 6 further comprise the components that are required for the charging process, such as charging control, a power supply, etc.

The charging device 4 is used for inductively charging a battery in the hearing device 6, which is not shown in more detail here.

Figure 3:
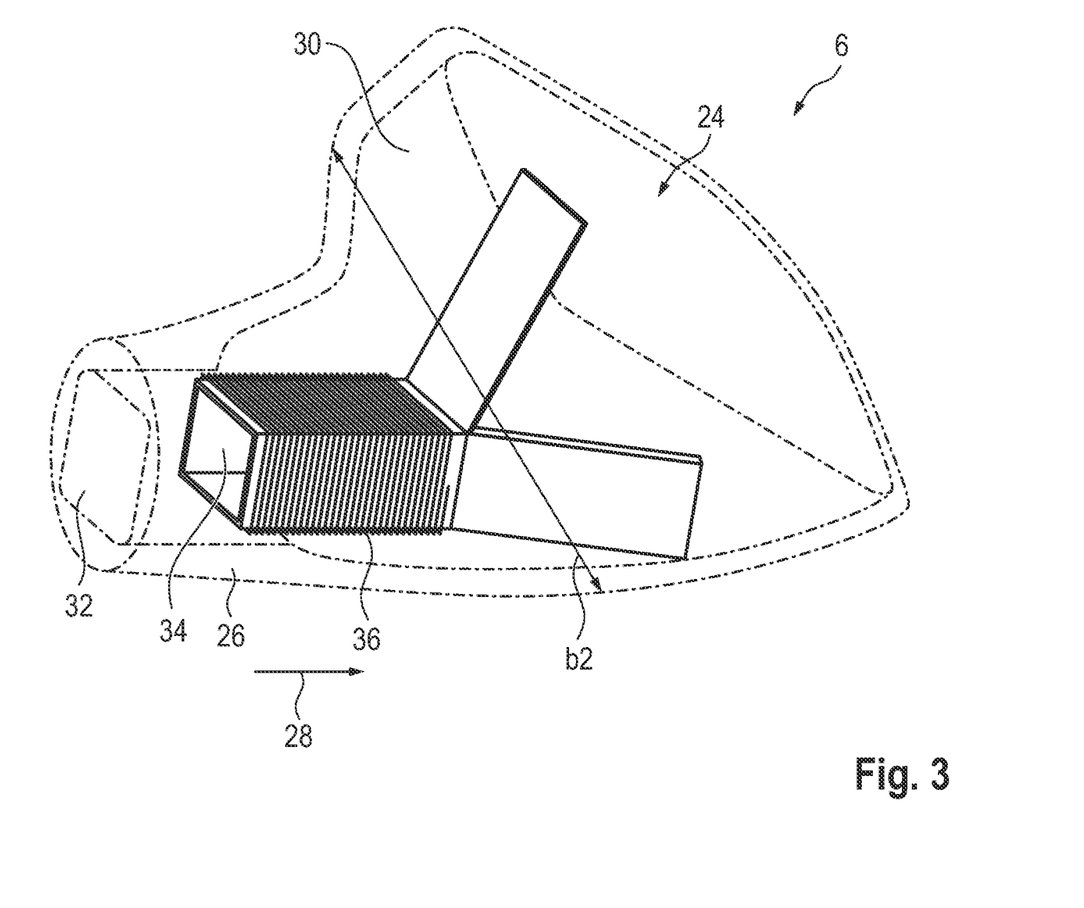
FIG. 3 is a simplified rudimentary view of a hearing device.

With reference to FIG. 3, the hearing device 6 is in particular an ITE hearing aid, which is preferably individually adapted to a respective user. The hearing device 6 has a housing 24 which is designed to be user-specific in this respect. The housing 24 is generally characterized by a front, tapering part 26, which is adjoined in a device-longitudinal direction 28 by a widened housing region 30. A sound exit channel or sound outlet 32 is formed on the front face of the front portion 26. A receiver 34 is arranged in the front part 26, which extends in the device-longitudinal direction 28. The receiver 34 emits sound to the sound outlet 32 during operation.

A secondary charging winding is wound around the receiver 34. The secondary winding has a secondary winding length L2 which extends in the device longitudinal direction 28.

A secondary magnetic layer 38 is arranged between the receiver 34 and the secondary charging winding 36. The secondary magnetic layer 38 preferably completely or at least almost completely surrounds the receiver 34 in the circumferential direction. In the device longitudinal direction 28, the secondary magnetic layer 38 extends further into the widened housing region 30. For this purpose, the secondary magnetic layer 38 has, in particular, tabs 40 which extend beyond the receiver 34 and widen. In particular, a total of four tabs 40 are provided, each extending from a cuboid side of the receiver 34. The individual tabs 40 enclose between them a space in which further components of the hearing device, such as the battery, a signal processing unit, etc., are arranged.

At the end opposite the sound outlet 32, the housing 24 has a further opening into which a component carrier, a so-called faceplate, is typically inserted. The secondary magnetic layer 38 and in particular also the tabs 40 are in particular a foil, in particular a ferrite foil. Preferably, a multilayer foil is provided, with a metallic layer and the magnetic layer 38 applied thereto. The metallic layer is in particular a copper layer.

Figure 2:
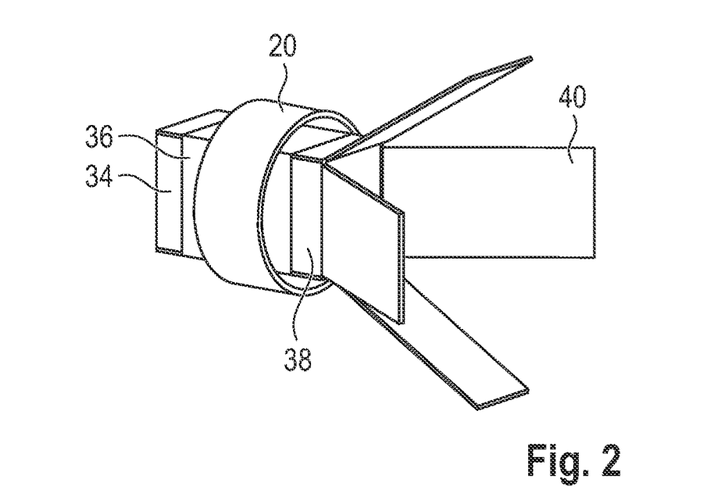
FIG. 2 is a simplified view of hearing device components in relation to a primary charging winding.

For charging, the hearing device 6—illustrated in FIG. 3—is inserted with the front part 26 into the receiving space 18, in particular into the inner space 22. Since the secondary charging winding 36 is arranged in the front part, a defined relative position is ensured between the primary charging winding 20 and the secondary charging winding 36. This situation is illustrated in FIG. 2. It can be seen that the two charging windings 20, 36 are arranged coaxially with respect to each other. Due to this arrangement, very good inductive coupling is achieved during the charging process, so that an efficient energy transfer can take place.

This is also supported in particular by the secondary magnetic layer 38, through which the magnetic field is guided in a targeted manner, thereby supporting the desired good magnetic coupling between the two windings 20, 36.

As can be seen from a synopsis of FIGS. 1 and 3, the housing 24 has a first radial extent b1 in the widened housing region 30 which is greater than a second radial extent b2 of the opening 16 which, in the case of a circular opening, is determined by its diameter. As a result, the hearing device 6 comes to rest with its widened housing region 30 on an opening edge 42, so that the hearing device 6 rests in a predetermined charging position in relation to the charging housing 8. As a result, a defined relative position is automatically assumed between the two charging windings 20, 36. The two charging windings 20, 36 thereby overlap maximally in the longitudinal direction 12. In the shown example, the primary winding length L1 is less than the secondary winding length L2. Preferably, the two winding lengths L1, L2 are chosen to be of equal length or at least approximately equal length. The expression "approximately equal length" should be understood that one winding length is longer or shorter by up to 10% or 20%. Depending on the design of the primary charging winding 20, it may have different primary winding lengths L1. Generally, the primary charging winding is for example formed as an air core coil. Such a coil preferably has a short winding length L1.

To improve inductive coupling, a primary magnetic layer 44 is provided surrounding the primary charging winding 20. Specifically, the primary magnetic layer 44 lines the inside of the receiving space 18, effectively forming the inside thereof. Preferably, this primary magnetic layer 44 is a ferrite foil or other permeable foil. Instead of a foil, an inherently rigid component made of a permeable material, for example ferrite, with a central hole defining the receiving space 18 is alternatively used. It is also possible to form the primary magnetic layer 44 by means of an inherently rigid tube with a plate forming the bottom 14. Generally, the primary magnetic layer 44 is formed according to a type of a lining of the receiving space 18 and is in particular also pot-shaped. It has, at the opening edge 42, in particular an annular flange 46 which covers the opening edge 42 at the end face. In the case of a solid design of the primary magnetic layer 44, this layer also forms the charging housing 8, for example.

Figure 4:
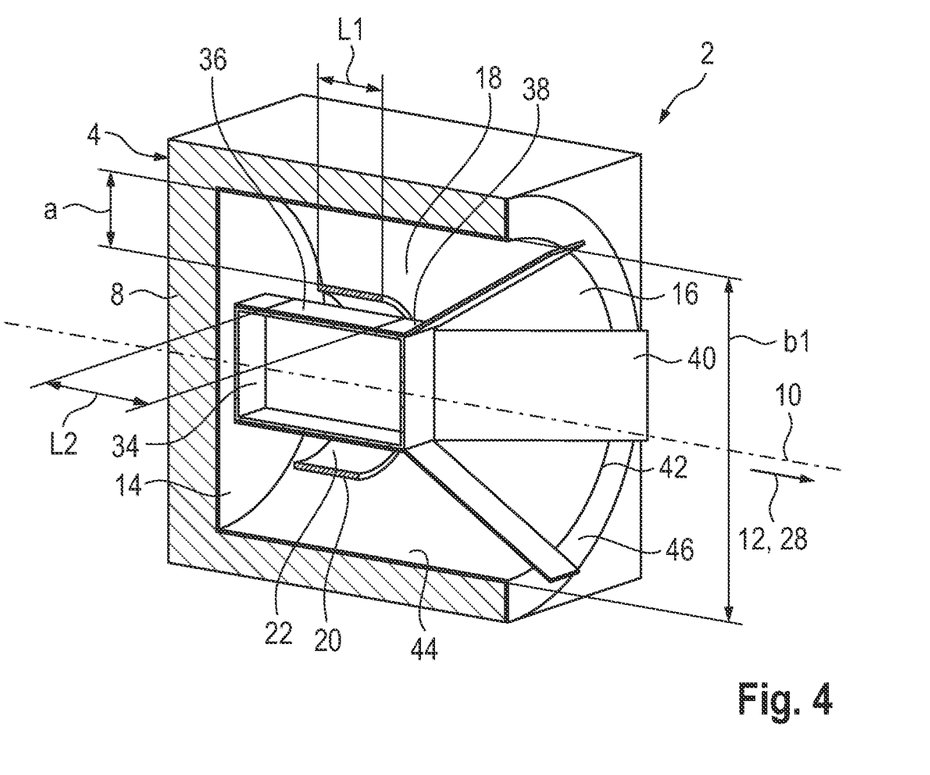
FIG. 4 is a sectional view similar to FIG. 1 taken through a charging system according to a second embodiment.
Figure 5:
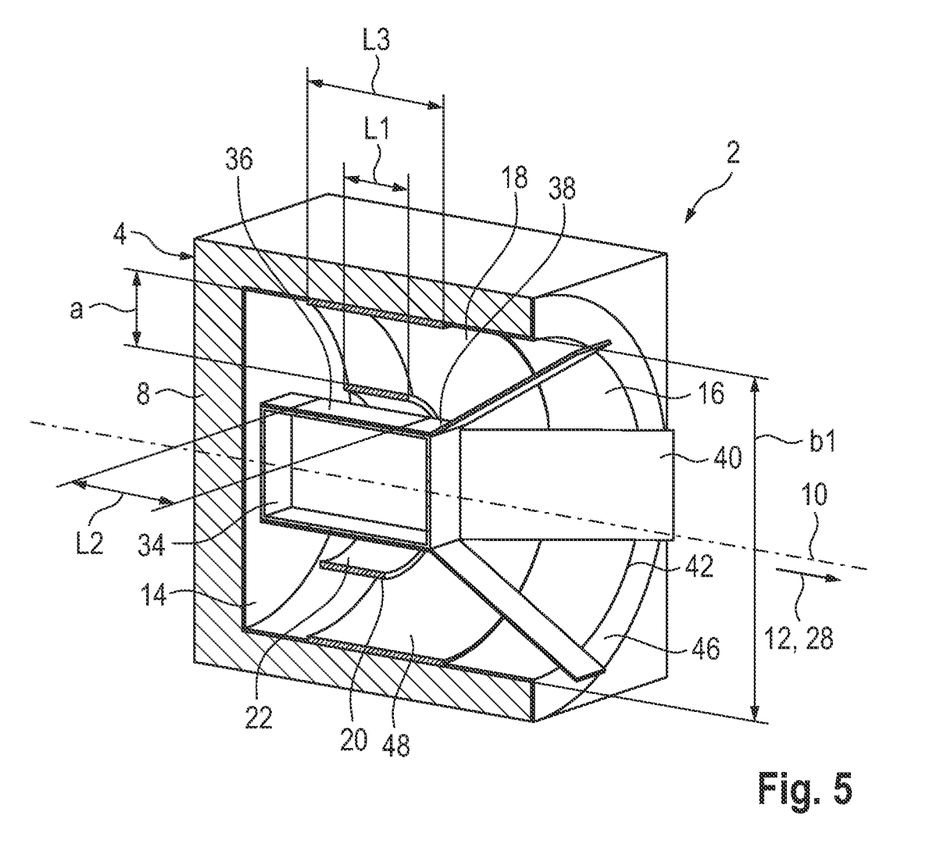
FIG. 5 a sectional view similar to FIG. 1 taken through a charging system according to a third embodiment.
Figure 6:
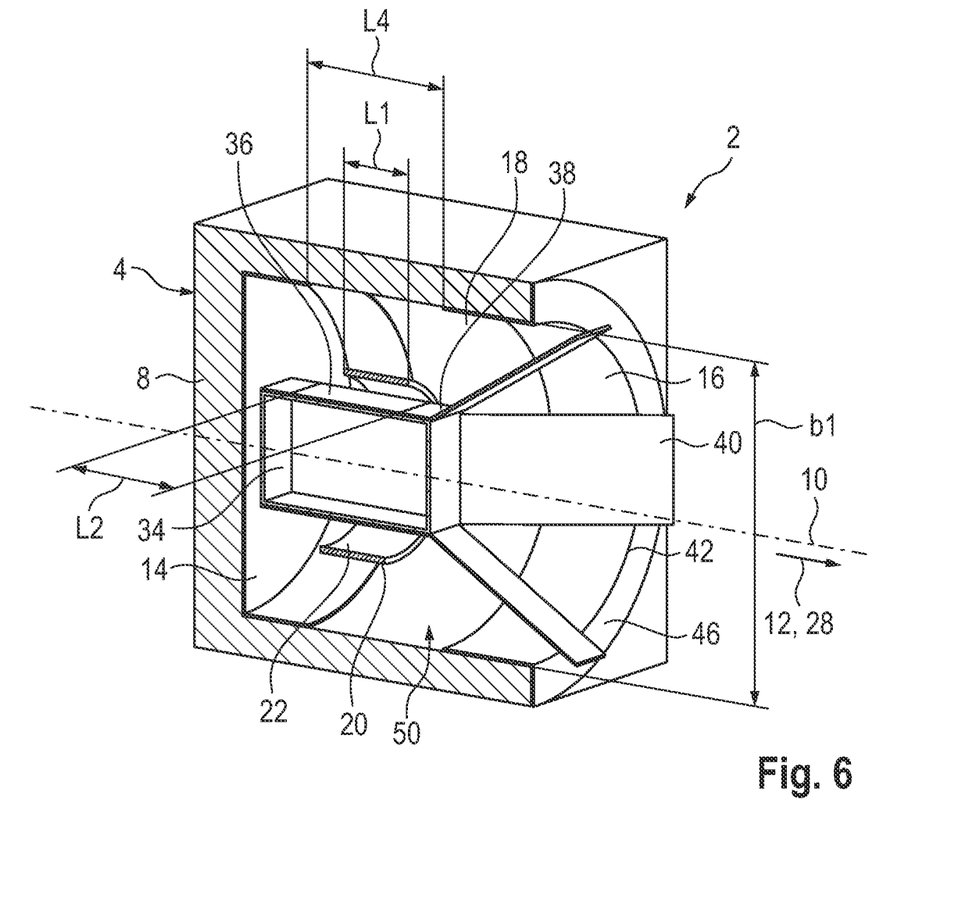
FIG. 6 a sectional view similar to FIG. 1 taken of a charging system according to a fourth embodiment.

As can be seen specifically from FIGS. 4-6, the secondary magnetic layer 38 and the primary magnetic layer 44 are arranged in close proximity in the region of the opening edge 42 when the hearing device 6 is in the charging position. During the charging process, the magnetic field lines each pass within the magnetic layers without having to travel any great distance through the air. Almost all the vortices of the magnetic field therefore run as a whole through the two magnetic layers (ferrite foils) and, in particular, are quasi bundled in the secondary magnetic layer 38 and thus run below the secondary charging winding 36. That is, they run through the secondary charging winding 36. Hereby, very good coupling between the two charging windings 20, 36 is achieved. In the region of the bottom 14, the field lines from the bottom 14 lined with the primary magnetic layer 44 are coupled back into the secondary magnetic layer 38.

In order to ensure that the magnetic field lines are reliably guided through the secondary magnetic layer 38 and thus through the interior of the secondary charging winding 36, a sufficiently large distance a is provided in the radial direction between the primary charging winding 20 and the primary magnetic layer 44 in the embodiment according to FIG. 4.

This distance a can be reduced if, for example, the permeability number of the secondary magnetic layer 38 is higher than that of the primary magnetic layer 44.

Further possibilities for reducing this distance a are shown in FIGS. 5 and 6:

According to FIG. 5, an electrically conductive layer 48 is formed in the region of the primary charging winding 20, which surrounds the primary charging winding 20 annularly. This electrically conductive layer 48 is, in particular, a metal foil, especially a copper foil. From a cost point of view, less expensive metals may also be used. Preferably, this electrically conductive layer 48 has a very low permeability with a permeability number lower than 1. For example, when less expensive metals are used, the permeability number may be higher than this, for example up to a permeability number of 30. The conductive layer 48 does not extend completely around the circumference and is formed as an open ring. The conductive layer 48 preferably extends only over a partial region in the longitudinal direction 12 of the receiving space 18, in particular only in the region of the primary charging winding 20. The conductive layer 48 has a first axial length L3, which corresponds at least to the primary winding length L1. The axial length L3 is, for example, in the range between 0.7 times and 2 times the primary winding length L1 or the secondary winding length L2. Alternatively, it has a greater length and may also line the entire receiving space 18 in a sheath-like manner. A double layer is therefore formed in the region of the conductive layer 48, formed from the primary magnetic layer 44 and the conductive layer 48.

In the embodiment according to FIG. 6, instead of the conductive layer 48, an interruption 50 of the primary magnetic layer 44 is formed, which is (completely) annularly circumferential. This interruption 50 has a second axial length L4, which is preferably approximately between 0.7 and 2 times the primary winding length L1 or the secondary winding length L2. The interruption 50 is again arranged at the axial level of the primary charging winding 20. In both cases, therefore, the primary charging winding 20 is preferably completely covered in the longitudinal direction 12 by the conductive layer 48 or interruption 50.

Figure 7A:
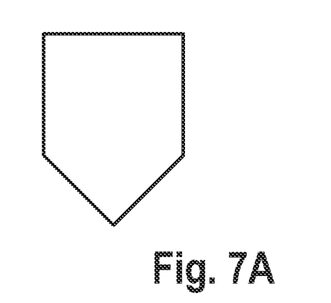
FIG. 7A-7C different simplified, schematic sectional views of a charging housing of the charging device.
Figure 7B:
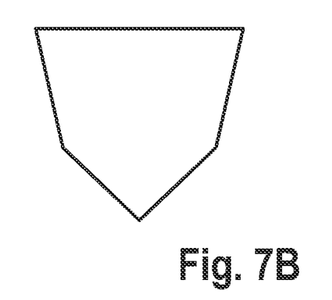
Figure 7C:
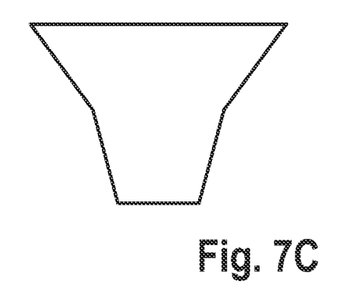

FIGS. 7A to 7C show further preferred geometries of the charging housing 8 and in particular of the receiving space 18 in a simplified manner. According to FIG. 7A, a cylindrical wall is provided in the upper region, which tapers towards the bottom and, for example, runs to a tip there. According to FIG. 7B, the upper cylindrical region of FIG. 7A is replaced by a region which widens conically in the longitudinal direction 12.

A particularly preferred variant is shown in FIG. 7C, in which the receiving space 18 widens continuously from a flat bottom 14 to the opening 16. In this embodiment, two widening sub-regions are provided which adjoin each other. In particular, the upper partial region oriented towards the opening 16 has a wall region which is preferably adapted to the wall region of the widened housing region 30 of the hearing device 6. The corresponding angles of the walls with respect to the longitudinal direction 12 are adapted to each other and are identical. This ensures that the outer wall of the widened housing region 30 is substantially parallel to the wall of the receiving space 18.

In a preferred embodiment, the overall geometry of the receiving space 18 is adapted to that of the housing 24 of the hearing device 6. Through this, a self-centering is achieved both in the radial direction and in the axial direction. Due to the adapted geometry, in particular the coupling between the two charging windings 20, 36 is positively influenced. In particular, this applies to embodiments with the primary magnetic layer 44, which is formed, for example, as a ferrite foil. This therefore follows the outer contour of the hearing device 6.

In the axial direction, the hearing device 6 in particular is generally held in such a way that it is arranged with its front end face in the region of the sound outlet 32 in the immediate vicinity of the bottom 14 or rests thereon.

The invention has been explained in more detail herein in connection with the specially designed ITE hearing aid 6. In principle, the charging system described herein can also be more generally applied to portable hearing devices such as, for example, headsets, wearables, etc. The invention is therefore not limited to the embodiments described herein. Rather, other variations may also be derived herein without departing from the subject matter of the invention. All of the individual features described in connection with the exemplary embodiments can be combined in other ways without departing from the subject matter of the invention.

The following is a summary list of reference numerals and the corresponding structure used in the above description of the invention:

2 charging system
4 charging device
6 hearing device
8 charging housing
10 center axis
12 longitudinal direction
14 bottom
16 opening
18 receiving space
20 primary charging winding
22 inner space
24 housing
26 front part
28 device-longitudinal direction
30 widened housing region
32 sound outlet
34 receiver
36 secondary charging winding
38 secondary magnetic layer
40 tabs
42 opening edge
44 primary magnetic layer
46 annular flange
48 electrically conductive layer
50 interruption
L1 primary winding length
L2 secondary winding length
L3 first axial length
L4 second axial length
b1 first radial extent
b2 second radial extent
a distance

The invention claimed is:

1. A charging system, comprising:
a hearing device having a front part configured for insertion into an auditory canal of a user, a secondary charging winding arranged in said front part and being disposed around a component of said hearing device; and
a charging device having:
a charging housing formed with a receiving space which extends along a center axis in a longitudinal direction and which has an opening at least to one side in the longitudinal direction;
a primary charging winding running around said center axis and surrounding an inner space that is formed to receive said hearing device, to be inserted with said front part thereof into said inner space; and
wherein, in an inserted state of said hearing device in said charging housing, said front part and said secondary charging winding are arranged within and surrounded by said primary charging winding;
at least one magnetic layer selected from the group consisting of:
a primary magnetic layer forming a part of said charging device and extending around said primary charging winding; and
a secondary magnetic layer arranged between said component and said secondary charging winding.

2. The charging system according to claim 1, wherein said component is a receiver.

3. The charging system according to claim 1, wherein said hearing device extends along a device-longitudinal direction of said device and has a housing which widens in the device-longitudinal direction and has a widened housing region, in such a way that a first radial extent of said widened housing region is greater than a second radial extent of said opening, so that the hearing device rests on an opening edge of said opening in an inserted state in said charging device.

4. The charging system according to claim 3, wherein said secondary magnetic layer extends in the device-longitudinal direction beyond said component into the widened housing region.

5. The charging system according to claim 1, wherein said secondary magnetic layer has a higher permeability number than said first magnetic layer of the charging device.

6. The charging system according to claim 1, wherein said primary magnetic layer forms an inner side of said receiving space.

7. The charging system according to claim 1, wherein said primary magnetic layer is formed at an opening edge of said opening.

8. The charging system according to claim 7, wherein said primary magnetic layer forms an annular flange at the opening edge of said opening.

9. The charging system according to claim 1, wherein said primary magnetic layer is radially spaced from said primary charging winding.

10. The charging system according to claim 1, which further comprises an electrically conductive layer arranged in a radial direction between said primary charging winding and said primary magnetic layer.

11. The charging system according to claim 10, wherein said electrically conductive layer is an open ring.

12. The charging system according to claim 10, wherein said electrically conductive layer extends in longitudinal direction only over a part of said primary magnetic layer.

13. The charging system according to claim 1, wherein said primary magnetic layer is interrupted in the longitudinal direction in a region of said primary charging winding.

14. The charging system according to claim 1, wherein said charging housing is formed with a bottom and said primary magnetic layer covers said bottom.

15. The charging system according to claim 1, wherein said receiving space widens in the longitudinal direction.

16. A charging device for charging a hearing device, the charging device comprising:

a charging housing formed with a receiving space which extends along a center axis in a longitudinal direction and which is formed with an opening in the longitudinal direction at least to one side, said opening being formed for at least a partial insertion of the hearing device into said receiving space with a front part of the hearing device that is configured for insertion into an auditory canal of a hearing device user;

a primary charging winding extending around said center axis and surrounding a free inner space enabling the front part of the hearing device to be inserted into the inner space; and a primary magnetic layer of the charging device extending around said primary charging winding; and wherein, in an inserted state of the hearing device in said receiving space, the front part and the secondary charging winding are arranged within, and surrounded by, the primary charging winding.

\* \* \* \* \*